Dec. 10, 1963    M. J. KIMBELL ETAL    3,113,458
TEMPERATURE RESPONSIVE RESISTANCE DEVICE
Filed April 17, 1961

WITNESSES
Wm. B. Sellers.
Clement J. Poznaka

INVENTORS
Charles V. Fields and
Marion J. Kimbell.
BY
Paul F. Friedemann
ATTORNEY 3,113,458
TEMPERATURE RESPONSIVE RESISTANCE
DEVICE
Marion J. Kimbell, Hayward Calif., and Charles V.
 Fields, Churchill Borough, Pa., assignors to Westinghouse Electric Corporation, East Pittsburgh, Pa., a corporation of Pennsylvania
Filed Apr. 17, 1961, Ser. No. 103,615
4 Claims. (Cl. 73—362)

This invention relates to temperature responsive resistance devices and more particularly to an electrical resistance thermometer.

Some of the characteristics that are desired in a resistance thermometer are high response speed and reliability such as stability and freedom from open circuits and turn-to-turn shorts or grounds.

In accordance with the present invention, the above desirable characteristics plus economy and ease of manufacture are obtained in a resistance thermometer by employing an electrically conductive film as the resistance element. We have found that the speed of response is improved because the extensive area of a film presents a wide thermal contact area with the insulator supporting the film as well as the large coextensive area on the opposite side of the film for improved temperature response, and because the film can be made very thin without suffering from the possible opens and turn-to-turn shorts or wire wound resistors.

It is therefore an object of the present invention to provide a temperature responsive device having high response speed and reliability.

It is another object of the present invention to provide an electrical resistance thermometer having high speed response and reliability.

Another object of the present invention is to provide a reliable high speed encased electrical resistance thermometer for insertion into fluids whose temperature is to be measured.

A further object of the invention is to achieve the foregoing objects in a structure conducive to economic and easy manufacture.

Other and further objects of the present invention will become apparent from the following description in conjunction with the drawings wherein a preferred embodiment of the invention is illustrated.

Figure 1:
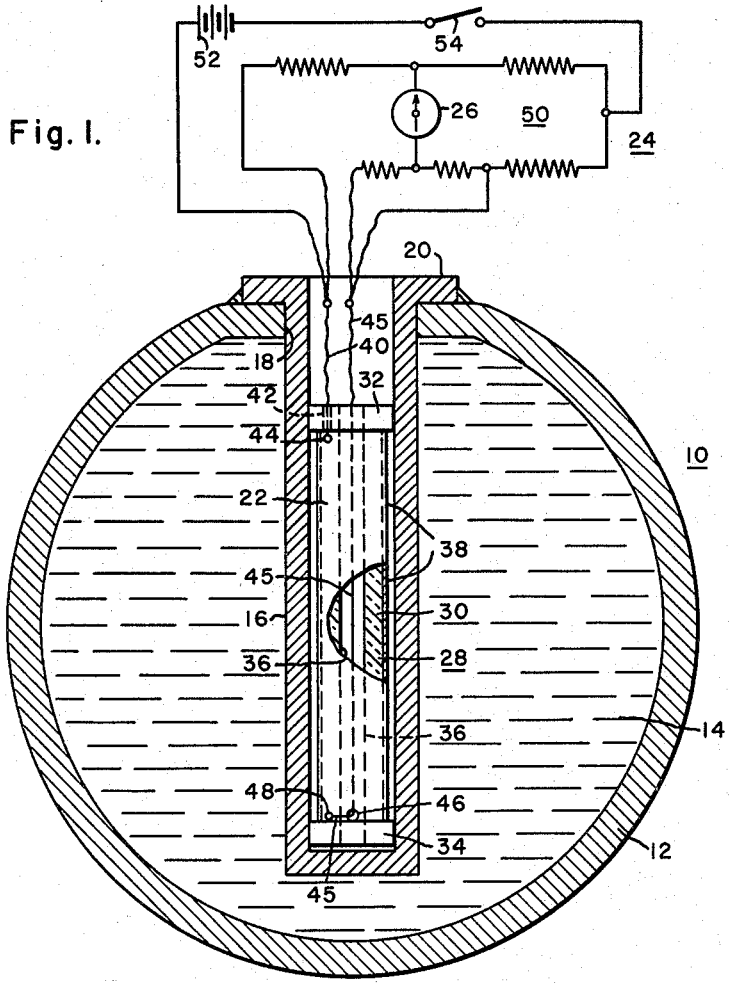
Figure 2:
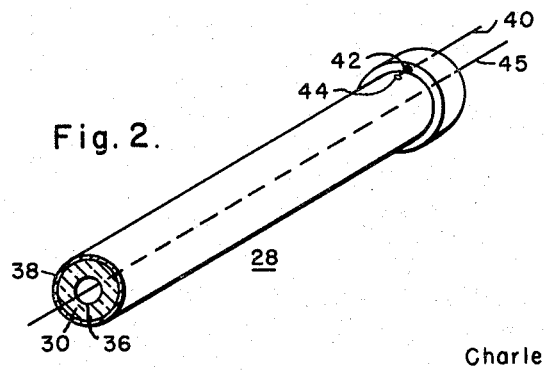

In the drawings: FIGURE 1 is an illustration partly in section of one embodiment of the invention shown in connection with an arrangement including an electrical circuit for measuring the temperature of a fluid filled zone such as a pipe or tank; and FIGURE 2 is a broken away perspective of the resistance element without the case.

In FIG. 1, there is shown a fluid receiving enclosure 10, for example a pressurized pipe or tank, which includes a wall 12 defining a fluid filled zone 14. Included in an arrangement for measuring the temperature of fluid in the zone 14, is a heat conductive well 16 formed by a circular tube with a closed end extending into the zone 14 through an aperture 18 in the wall 12. The outer end of the tube is provided with an annular flange 20 bonded to the wall 12 to form a fluid-tight seal. The well 16 is made of material having a high thermal conductivity, for example a metal such as copper and for fast response should be as thin as possible consistent with structural requirements.

Disposed within the well 16 is a temperature responsive resistance unit 22 connected into an electrical measuring circuit 24, whose electrical output meter 26 provides an output which is a function of the resistance of the unit 22 and thereby of the ambient temperature around the unit.

The unit 22 is provided with a spool shaped heat resistant, electrically insulating base or core 28 having a hollow cylindrical central body section 30, and circular end flanges 32 and 34 at opposite ends of the body portion 30. An aperture 36 extends axially through the entire length of the core 28. Although the core may be made of any suitable electrically insulating material, a ceramic such as alumina may be advantageously employed.

The peripheral outer surface of the body portion 30 is coated with a relatively thin electrically conductive film made of material whose resistance changes with temperature. While not restricted thereto, the conductive film 38 may be a metallic film, for example a platinum film. For consistent heat transfer from the well wall to the core 28 through the flanges 32 and 34, the dimensions of the flanges should be such as to provide a snug fit of the unit 22 within the well 16, and to permit ready entry or withdrawal of the unit from the well. The radial extent of flanges 32 and 34 from the film coated surface of the body section 30 should be only sufficient to prevent the film from contacting the well wall. While it should be insulated from the well 16, the film 38 should be as close as possible to the well wall in order to get the highest speed of heat transfer and response. If desired, instead of air insulation between the film 38 and the well wall, other suitable high temperature electrical insulation may be employed such as mica wrapped around the film coated surface, or lining the inner surface of the well wall.

A terminal lead 40, passing through an axial aperture 42 through flange 32, is connected at 44 to the upper end of the film 38, for example by soldering. Another terminal lead 45 passes through the aperture 36 and an axial aperture 46, and is connected to the lower end of the film 38 at 48.

Through leads 40 and 45, the film 38 is connected as the unknown arm of the Kelvin bridge circuit 24. A battery 52 is connected across the input diagonals of the bridge through a switch 54, while the output diagonals of the bridge are connected to the output meter 26, which for example, may be a galvanometer suitably calibrated in terms of temperature. Since the resistance value of the film is a function of the ambient temperature, the reading of the calibrated output meter 26 will be indicative of the temperature of the fluid surrounding the well 16.

As a practical matter, the well 16 may be considered as a reentrant portion of the wall 12. Also the arrangement including the well 16 with the heat responsive resistance element 22 disposed therein, may be considered as the bulb of an electrical resistance thermometer.

The conductive film 38 may be applied to the base or core by any of the many known methods of producing thin, electrically conductive films on insulating bodies, such as vapor deposition, spraying, application and firing of metal compounds in suitable vehicles, etc. Metallic films may be provided on an electrically insulating body such as ceramic by vapor deposition or other metallizing procedures, such as the application and firing of an organo-compound of a suitable metal on the insulating body. For example, an organic resinate of a metal, such as platinum resinate, may be applied on the insulating base, and fired to precipitate the metal and to oxidize or drive off the organic portions. Examples of the latter procedure employing platinum and palladium resinates are described in U.S. Patent No. 2,281,843. The film thickness which may be of the order of 5 micro inches is shown exaggerated in the drawing.

Since the response time increases with increasing thickness of the film, it is advantageous to make the film as thin as possible consistent with other parametric requirements.

In FIG. 1, the well 16 and the resistance unit 22 constitute a temperature probe extending into the fluid zone 14. However, it may be desirable for some purposes to employ the resistance unit 22 alone as the temperature probe, in which case a surrounding casing or well is dispensed with, and the resistance unit 22 is inserted directly into the fluid whose temperature is to be measured. This increases the response speed. In addition, the surface of the non-conductive core 30 under the film 33 is protected by the film from possible injurious attack by the fluid. For maximum protection of the core, the entire lower end of the core may be covered by the conductive film, and only the film coated portion of the probe be inserted into the fluid whose temperature is to be measured. From the above it should be apparent that the temperature probe may or may not include a surrounding casing such as the well 16.

It is to be understood that the herein described arrangements are simply illustrative of the principles of the invention, and that other embodiments and applications are within the spirit and scope of the invention.

We claim as our invention:

1. Temperature responsive apparatus comprising a thermo-conductive tube for insertion into a fluid whose temperature is to be sensed, said tube having an inner surface, a temperature responsive resistance device disposed within said tube, said device comprising an electrically insulating core having an outer peripheral surface facing said inner surface of the tube, a metallic film on said peripheral surface, said film having temperature responsive electrical resistance, said core having radially extending portions for engaging the inner wall of the tube thereby to space the filmed surface from said inner wall of the tube, an electrical circuit connected to said film for producing an output which is a function of the ambient temperature around said film.

2. Temperature responsive apparatus comprising a thermo-conductive tube, a temperature responsive resistance device disposed within said tube, said device comprising a spool-shaped insulating core having a central body portion with an axial passage therethrough and also having radial flanges at opposite ends of the body portion, a conductive film on the outer peripheral surface of said central body portion, said film having temperature responsive electrical resistance, an electrical lead connected to said film at one end of said spool, said lead passing through said axial passage, another electrical lead connected to the film at the other end of the spool, and an electrical circuit connected to said leads for producing an output which is a function of the ambient temperature around said film.

3. An electrical resistance thermometer comprising a thermo-conductive tube for insertion into a fluid whose temperature is to be sensed. Said tube having an inner surface, a temperature responsive resistance device disposed within said tube, said device comprising an electrically insulating core having an outer peripheral surface facing said inner surface of the tube, a conductive film on said peripheral surface, said film having temperature responsive electrical resistance, said core having radially extending portions for engaging the inner wall of the tube thereby to space the filmed surface from said inner wall of the tube, and electrical circuit connection to spaced apart locations on said film.

4. An electrical resistance thermometer comprising a thermo-conductive tube, a temperature responsive resistance device disposed within said tube, said device comprising a spool-shaped insulating core having a central body portion with an axial passage therethrough and also having radial flanges at opposite ends of the body portion, a conductive film on the outer peripheral surface of said central body portion, and film having temperature responsive electrical resistance, an electrical lead connected to said film at one end of said spool, said lead passing through said axial passage, and another electrical lead connected to the film at the other end of the spool.

References Cited in the file of this patent

UNITED STATES PATENTS

| | | |
|---|---|---|
| 2,021,491 | Ruben | Nov. 19, 1935 |
| 2,440,691 | Jira | May 4, 1948 |
| 2,870,305 | Sung-Ching Ling | Jan. 20, 1956 |
| 2,945,196 | Shanley | July 12, 1960 |

OTHER REFERENCES

Article by Demarles from French Publication "Measures," August 1944; page 205. (Copy in Scientific Library, call #TK275M4 and in Division 56.)